United States Patent
Cartei et al.

(10) Patent No.: US 10,264,923 B2
(45) Date of Patent: Apr. 23, 2019

(54) BLENDER WITH A SEALING GASKET COMPRISING RIBS

(71) Applicant: KONINKLIJKE PHILIPS N.V., Eindhoven (NL)

(72) Inventors: Mirko Cartei, Eindhoven (NL); Bengt Ivar Anders Ivarsson, Eindhoven (NL); Sam Xu, Eindhoven (NL); Samuel Cuaresma, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/571,641

(22) PCT Filed: May 23, 2016

(86) PCT No.: PCT/EP2016/061513
§ 371 (c)(1),
(2) Date: Nov. 3, 2017

(87) PCT Pub. No.: WO2016/193029
PCT Pub. Date: Dec. 8, 2016

(65) Prior Publication Data
US 2018/0140139 A1   May 24, 2018

(30) Foreign Application Priority Data

May 29, 2015 (WO) ................ PCT/CN2015/080320
Aug. 4, 2015 (EP) .................................... 15179622

(51) Int. Cl.
A47J 43/07 (2006.01)
A47J 43/046 (2006.01)
(Continued)

(52) U.S. Cl.
CPC ........ *A47J 43/0716* (2013.01); *A47J 43/046* (2013.01); *F16J 15/3232* (2013.01); *B01F 2015/00084* (2013.01)

(58) Field of Classification Search
CPC ......... A47J 43/0716; F16J 15/02; F16J 15/06; F16J 15/061; F16J 15/062; F16J 15/10; F16J 15/102; F16J 15/104; F16J 15/106
See application file for complete search history.

(56) References Cited

U.S. PATENT DOCUMENTS

D168,674 S   *   1/1953   Collura ......................... D7/378
D195,241 S   *   5/1963   Chapman et al. ............. D7/378
(Continued)

FOREIGN PATENT DOCUMENTS

JP          4888380 U      10/1973
JP          5480571 U       6/1979
(Continued)

OTHER PUBLICATIONS

Espacenet. Translation of JPH0723870. Retrieved Jun. 1, 2018. pp. 1-7. <http://translationportal.epo.org/>. (Year: 1995).*

*Primary Examiner* — Abbas Rashid

(57) ABSTRACT

The invention relates to a blender (200) comprising a base part (201), and a container (202) arranged on the base part (201). The container (202) comprises a detachable bottom part (203). The blender 200 also comprises a sealing gasket (204) arranged between the detachable bottom part (203) and the container (202). The sealing gasket (204) comprises at least one rib (205) extending upwards inside the container (202). By having the ribs directly part of the sealing gasket, the container does not need any ribs on its inside surface.

13 Claims, 10 Drawing Sheets

(51) Int. Cl.
*F16J 15/3232* (2016.01)
*B01F 15/00* (2006.01)

(56) References Cited

U.S. PATENT DOCUMENTS

| | | | | |
|---|---|---|---|---|
| D201,169 S | * | 5/1965 | Rawson | D7/378 |
| D204,224 S | * | 3/1966 | Gantz et al. | D7/378 |
| 3,344,829 A | | 10/1967 | Ripple | |
| 3,596,692 A | * | 8/1971 | Swanke | A47J 43/046 |
| | | | | 241/199.12 |
| 3,729,204 A | | 4/1973 | Augustin | |
| 6,609,821 B2 | * | 8/2003 | Wulf | A47J 43/042 |
| | | | | 318/256 |
| 7,566,186 B2 | * | 7/2009 | Katz | A47J 43/085 |
| | | | | 366/199 |
| 7,950,842 B2 | * | 5/2011 | Pryor, Jr. | A47J 43/0766 |
| | | | | 366/142 |
| 8,042,990 B2 | * | 10/2011 | Pryor, Jr. | A47J 43/0766 |
| | | | | 366/197 |
| 8,087,603 B2 | * | 1/2012 | Kolar | A47J 43/0716 |
| | | | | 181/198 |
| 8,287,180 B2 | * | 10/2012 | Kolar | A47J 43/0716 |
| | | | | 366/347 |
| 9,084,512 B2 | * | 7/2015 | Boozer | A47J 43/0716 |
| 2005/0152215 A1 | * | 7/2005 | Stuart | A47J 43/0716 |
| | | | | 366/205 |
| 2007/0140048 A1 | * | 6/2007 | Ismail | A47J 43/085 |
| | | | | 366/205 |
| 2008/0089171 A1 | * | 4/2008 | Larsen | A47J 43/046 |
| | | | | 366/206 |
| 2009/0095459 A1 | * | 4/2009 | Williams | A47J 43/085 |
| | | | | 165/177 |
| 2015/0101491 A1 | | 4/2015 | Lin | |

FOREIGN PATENT DOCUMENTS

| | | |
|---|---|---|
| JP | 54107572 A | 8/1979 |
| JP | 0723870 A | 1/1995 |
| JP | 2013146330 A | 8/2013 |
| WO | 2009000042 A1 | 12/2008 |

* cited by examiner

BLENDER WITH A SEALING GASKET COMPRISING RIBS

This application is the U.S. National Phase application under 35 U.S.C. § 371 of International Application No. PCT/EP2016/061513, filed on May 23, 2016, which claims the benefit of International Application No. PCT/CN2015/080320 filed on May 29, 2015 and International Application No. 15179622.4 filed Aug. 4, 2015. These applications are hereby incorporated by reference herein.

FIELD OF THE INVENTION

The invention relates to a blender with a sealing gasket comprising ribs.

The invention may be used in the field of food blending, in particular kitchen appliance blenders.

BACKGROUND OF THE INVENTION

Blenders are kitchen appliances which are designed for mixing or blending food ingredients such as fruit, milk and ice, into liquids. Blenders typically consist of a base, having a vertically positioned powerful a/c motor with a lower coupling, and a cylindrical jar located directly above the base. The jar has a rotatable blade assembly at the bottom with an upper coupling driven by the lower coupling. The blade assembly is usually mounted in a blade-holding component which forms the bottom of the jar with a water tight seal in between, and removable for easy cleaning.

The blending performance of a blender is usually measured by the fineness of blended food ingredients after a limited time of blending. Critical for good performance of a blender is the diameter of the jar at blade height, but also the presence of turbulence-creating ribs of similar formations inside the jar, for example at blade assembly height. Such rib formations reduce spinning of liquid inside the jar, which thus enhances blending performance.

For hygiene, cleaning and durability reasons, blenders usually have jar made of glass material.

An example of a known blender 100 is depicted in FIG. 1. It comprises a base part 101 and a jar 102 made of glass arranged on the base part 101. The bottom part of the jar 102 is closed by a detachable bottom part 103. A sealing gasket 104 is disposed between the detachable bottom part 103 and the jar 102. The jar 102 comprises ribs 105 extending upwards on the inside surface of the jar 102. The ribs 105 are made of glass and are moulded together with the wall of the jar 102. A blade assembly 106 is disposed on the bottom part 103 and rotated by a motor assembly 107 disposed in the base part 101.

When manufacturing a jar made of glass, to facilitate the manufacturing, it is preferred that the geometry is cylindrical and uniform, without large protruding ribs inside the jar. This creates a dilemma since the very same ribs are critical to obtain good blending performance. The width of the ribs can be reduced to facilitate the moulding during manufacturing, but to the detriment of blending performance.

OBJECT AND SUMMARY OF THE INVENTION

It is an object of the invention to propose a blender that mitigates and/or alleviates the above mentioned problems by providing an improved blending performance.

The invention is defined by the independent claims. The dependent claims define advantageous embodiments.

To this end, the blender according to the invention comprises:

a base part, a container arranged on the base part, the container comprising a detachable bottom part, a sealing gasket arranged between the detachable bottom part and the container, characterized in that the sealing gasket comprising more than one rib extending upwards inside the container, wherein the more than one rib comprises a plurality of ribs distributed around an inner periphery of the sealing gasket.

By having the ribs directly part of the sealing gasket, the jar can be made of glass without any ribs on the inside surface of the jar. The manufacturing of the glass jar is thus facilitated because the inside surface of the jar does not have protuberances. This also contributes to an easier cleaning of the inside jar by a user. Moreover, high blending performance of the blender is ensured by having some ribs still extending inside the jar. Since the sealing gasket is a removable part of the blender, this also contributes to an easier cleaning of the ribs by a user. Having a plurality of ribs improves the blending performance.

Advantageously, the more than one rib extends along an internal surface of a lower portion of the container.

This allows improving the blending performance, because the ribs are disposed where the solid food ingredients tend to accumulate by gravity.

Advantageously, at least one of the more than one rib comprises a tab portion extending along a direction being radial compared to an inner periphery of the sealing gasket.

The tab portion creates additional turbulences among the food ingredients during blending, which further improves the blending performance.

Advantageously, the tab portion is arranged at an upper part of the more than one rib.

Having the tab portion disposed at this position helps to retain the food ingredients in a lower part of the jar. This helps limit that the food ingredients splash upwards inside/outside the jar during blending, and also further improves the blending performance.

Advantageously, the tab portion forms a truncated pyramid.

This shape allows creating optimum turbulences of the food ingredients during blending.

Advantageously, the sealing gasket comprises a ring element having a first surface facing the detachable bottom part and a second surface facing the container, wherein at least one of the first surface and the second surface comprises concentric compression ribs.

The concentric compression ribs arranged on the ring element further improve the sealing between the detachable bottom part and the container.

Advantageously, the sealing gasket and the more than one rib form a single element made of moulded rubber material.

Moulding the ribs together with the sealing gasket allows an easy manufacturing of this assembly.

Advantageously, the more than one rib has a height in the range [10 mm; 50 mm].

This range of value contributes to obtaining optimal blending performance for kitchen appliance blenders.

Advantageously, the more than one rib has a thickness in the range [3 mm; 15 mm].

This range of value contributes to obtaining optimal blending performance for kitchen appliance blenders.

Advantageously, the more than one rib has a width in the range [10 mm; 30 mm].

This range of value contributes to obtaining optimal blending performance for kitchen appliance blenders.

Advantageously, the blender further comprises a blade assembly comprising a plurality of blades and arranged on the bottom part and extending inside the container, and a gearing system to rotate the blade assembly. The more than one rib extends upwards inside the container up to a height where the plurality of blades connect, with a variation within a range of [−20%; +100%].

Having the ribs extending upwards up to this range of values contributes to obtaining optimal blending performance.

Advantageously, the blender further comprises a locking element to press the container, the sealing gasket and the detachable bottom part against each other.

This allows maintaining all elements in place during blending, while ensuring sealing.

Advantageously, the base part further comprises a heating element to transfer heat by conduction to the detachable bottom part.

The heating element allows cooking the food ingredients being inside the jar, for example after blending, while having the possibility to easily detach the jar from the base after cooking.

Detailed explanations and other aspects of the invention will be given below.

BRIEF DESCRIPTION OF THE DRAWINGS

Particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

Figure 2:
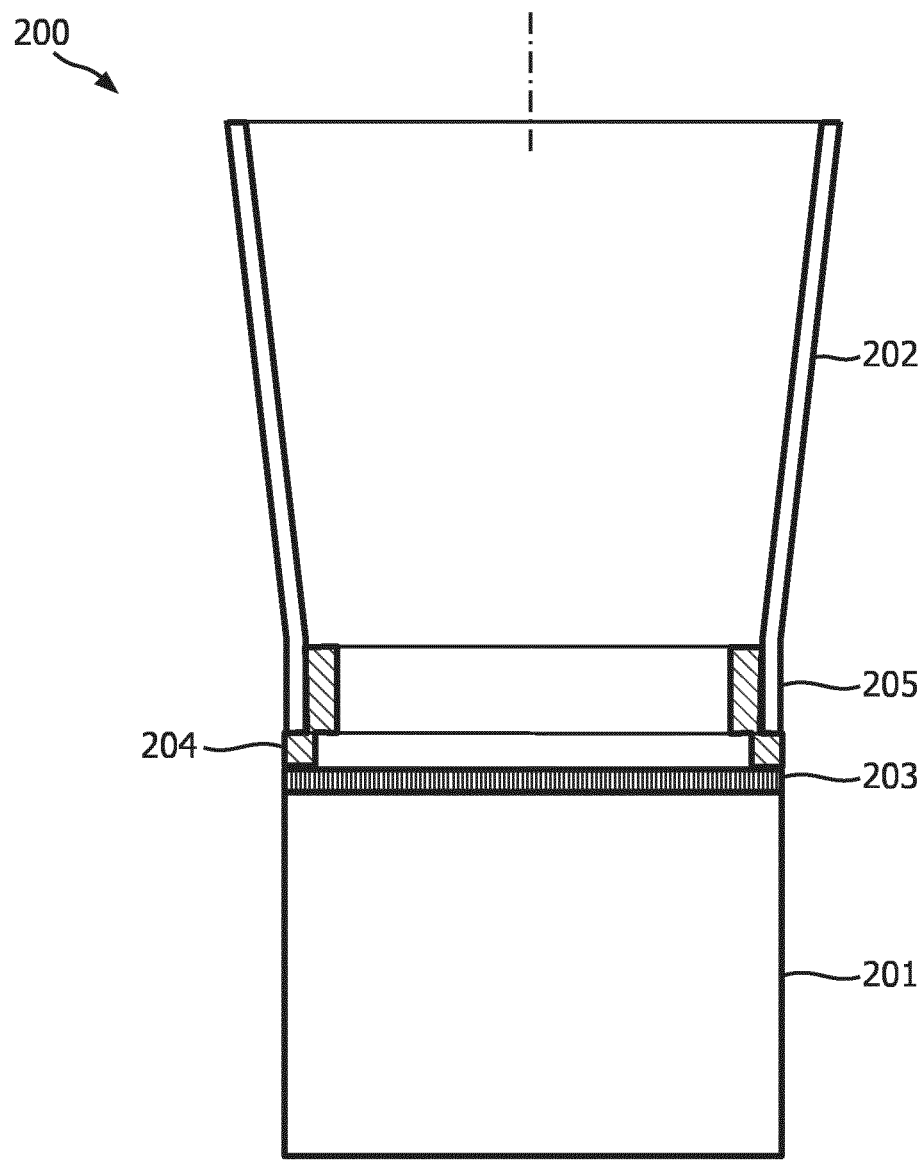
FIG. 2 depicts a simplified view of a blender according to the invention.

FIG. 2 depicts a blender 200 according to the invention.

The blender 200 comprises a base part 201. The base part 201 is intended to receive the gearing system (not shown) to rotate a blade assembly (not shown) used to blend food ingredients.

The blender 200 also comprises a container 202 arranged on the base part 201. The container 202 corresponds to the jar in which food ingredients to be blended are put.

The container 202 comprises a detachable bottom part 203. The detachable bottom part 203 is intended to close the bottom part of the container 202.

The blender 200 also comprises a sealing gasket 204 arranged between the detachable bottom part 203 and the container 202. One function of the sealing gasket 204 is to ensure the sealing between the detachable bottom part 203 and the container 202 to prevent food ingredients and liquid in the container 202 from leaking outside the container 202.

The sealing gasket 204 also comprises more than one rib 205 extending upwards inside the container 202. The rib(s) 205 aims to create turbulences among the food ingredients during blending, to improve the blending performance. The more than one rib 205 replaces the ribs made of glass and moulded together with the jar of the known blenders.

Figure 1:
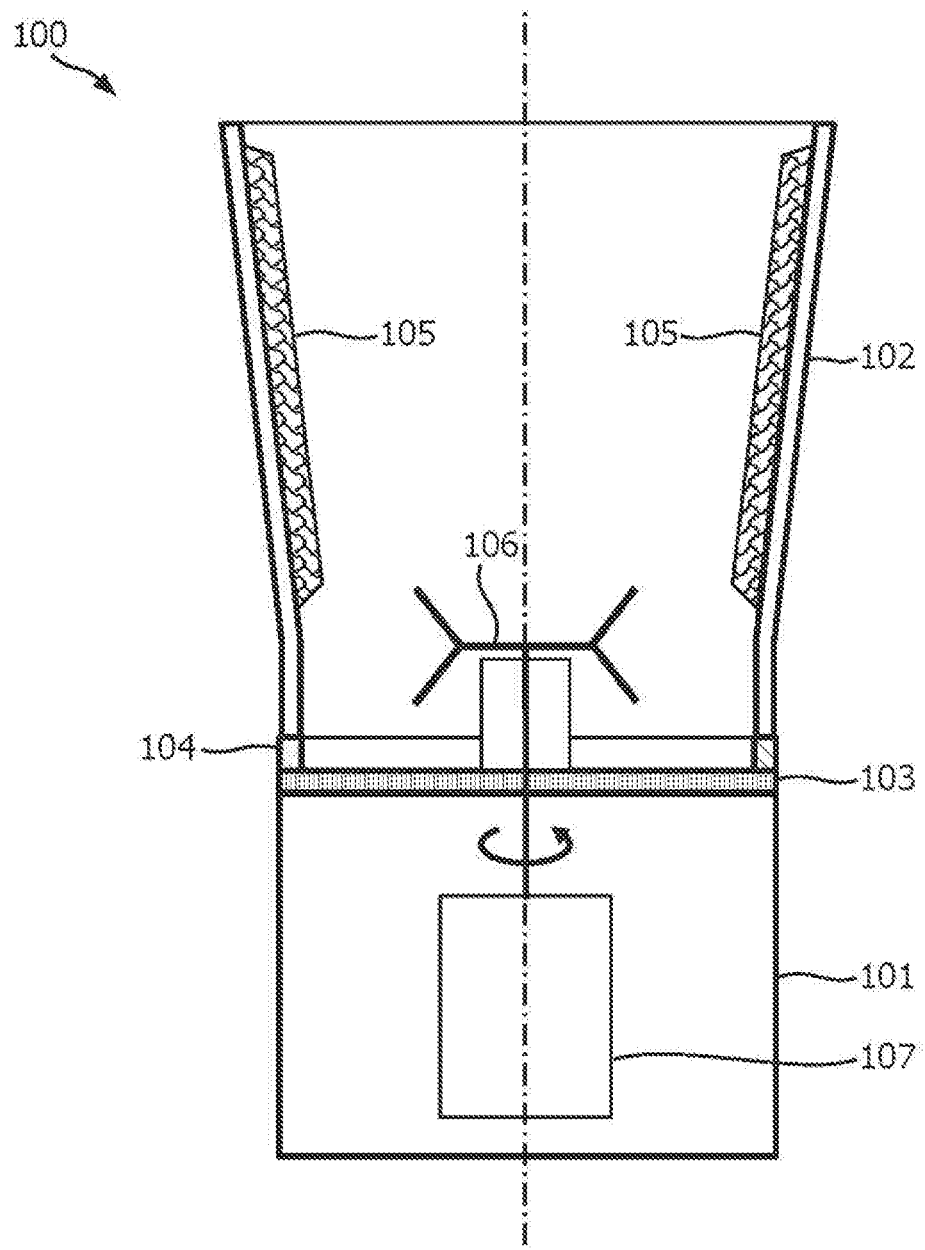
FIG. 1 depicts a blender according to the prior art.
Figure 3:
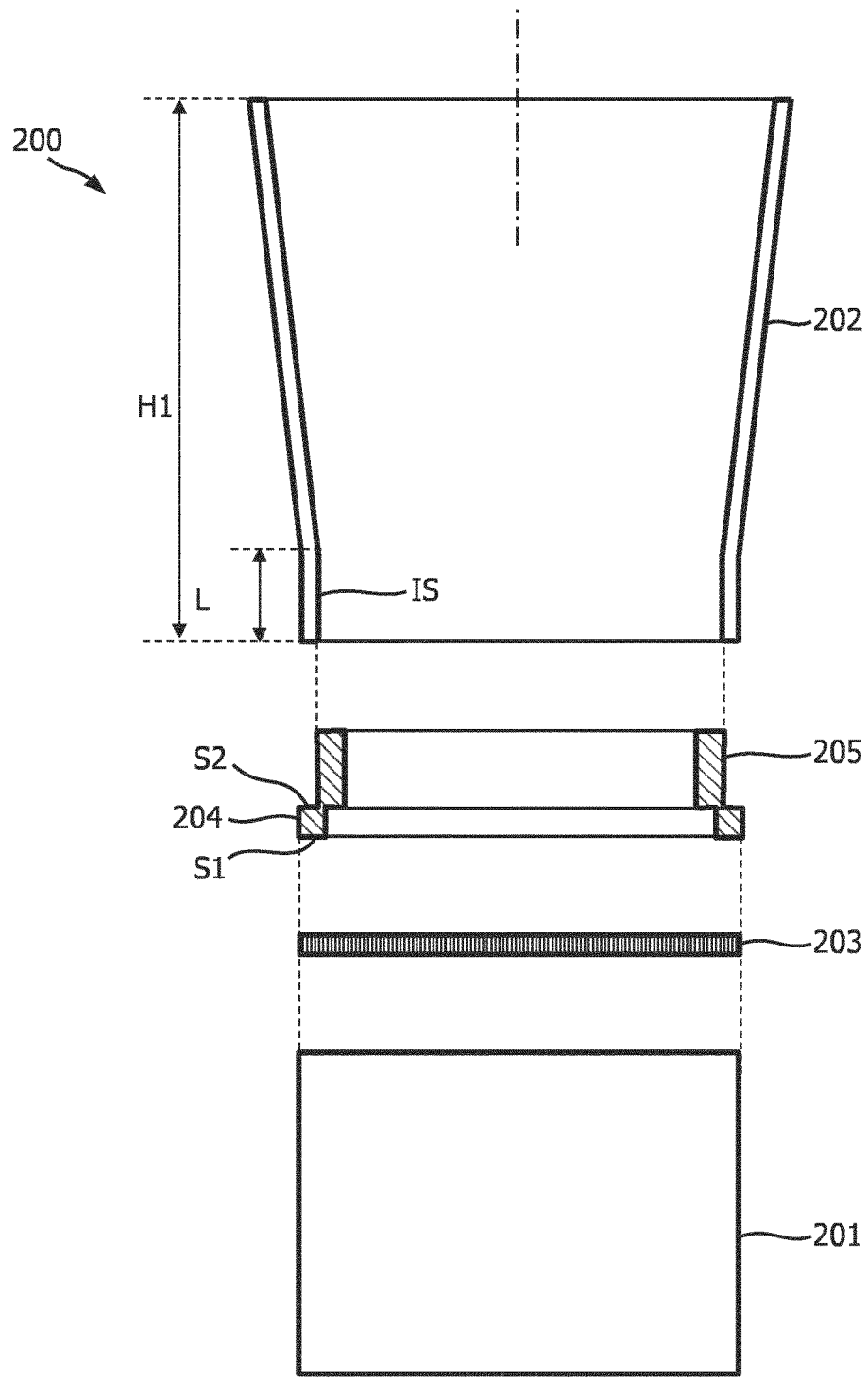
FIG. 3 depicts an exploded view of a blender as depicted in FIG. 2.
Figure 4:
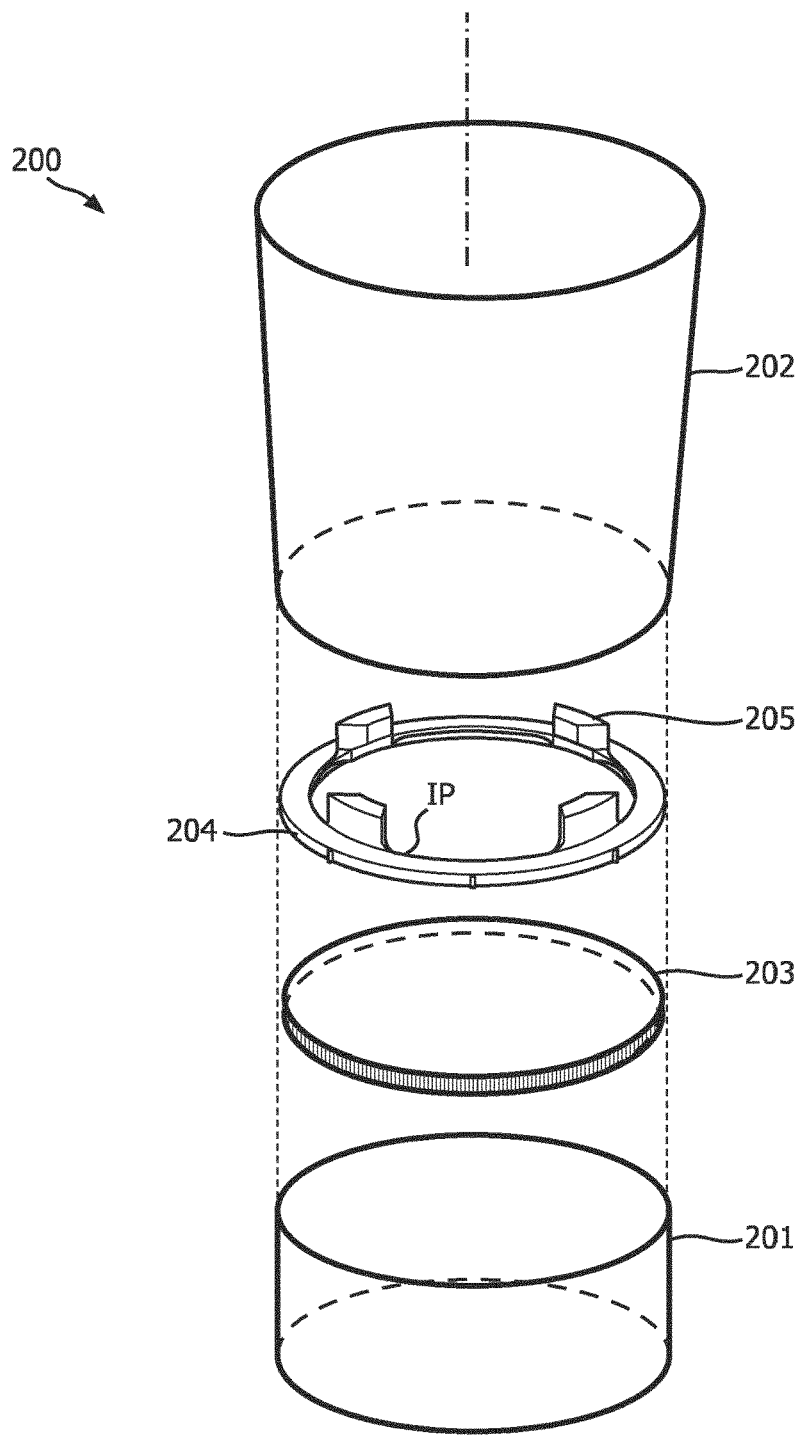
FIG. 4 depicts a three-dimensional exploded view of a blender as depicted in FIG. 3, FIG. 5A, FIG. 5B, FIG. 5C, FIG. 5D depict different embodiments of a sealing gasket according to the invention comprising a tab portion.

FIG. 3 depicts an exploded view of a blender 200 according to the invention, and FIG. 4 depicts a corresponding three-dimensional exploded view. Those figures illustrate the same elements as in FIG. 1. The cross-section of the blender 200 is preferably circular.

Preferably, as illustrated in FIG. 3, the more than one rib 205 extends along an internal surface 1S of a lower portion L of the container 202. The lower portion L corresponds to the bottom part of the container 202 covering between 5% and 20% of the height H1 of the container 202.

Preferably, the more than one rib 205 comprises a plurality of ribs distributed around an inner periphery IP of the sealing gasket 204. For example, as illustrated in FIG. 4, a number of four ribs 205 is chosen. Advantageously, the ribs are regularly distributed around the inner periphery IP. For example, if a number of four ribs 205 is chosen, the ribs are distributed every 90 degrees around the inner periphery IP.

FIG. 5A, FIG. 5B, FIG. 5C, FIG. 5D depict various embodiments of a sealing gasket according to the invention comprising a tab portion 207.

Preferably, at least one of the more than one rib 205 comprises a tab portion 207 extending along a direction RD being radial compared to an inner periphery IP of the sealing gasket 204. The direction RD directs toward the center of the periphery IP.

Preferably, the tab portion 207 is arranged at an upper part U of the at least one of the more than one rib 205.

Figure 5A:
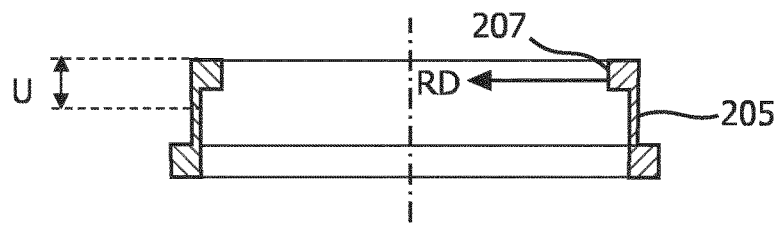
Figure 5B:
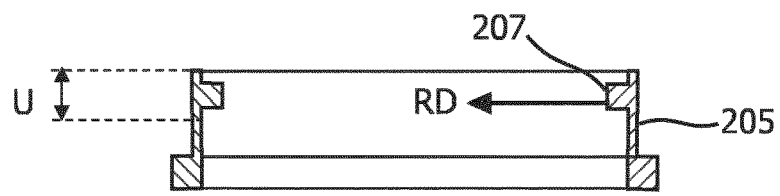
Figure 5C:
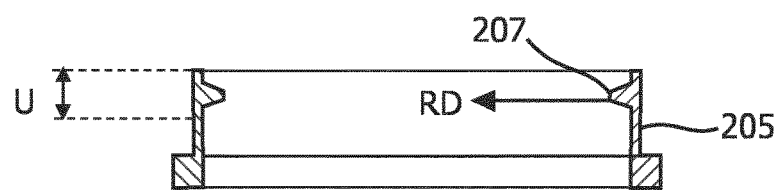
Figure 5D:
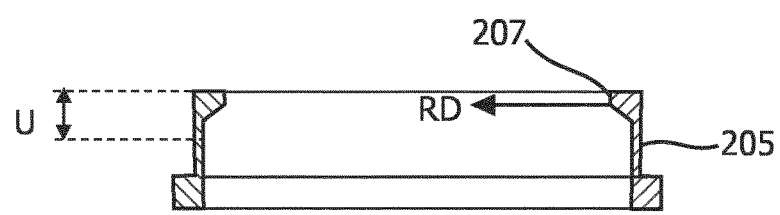

For example, as depicted by FIG. 5A and FIG. 5D, the tab portion 207 is at the most upper part of the rib 205.

For example, as depicted by FIG. 5B and FIG. 5C, the tab portion 207 is slightly below the most upper part of the rib 205.

For example, as depicted by FIG. 5A and FIG. 5B, the tab portion 207 takes the form of a cubic element.

For example, as depicted by FIG. 5C and FIG. 5D, the tab portion 207 takes the form of a truncated pyramid.

Figure 6A:
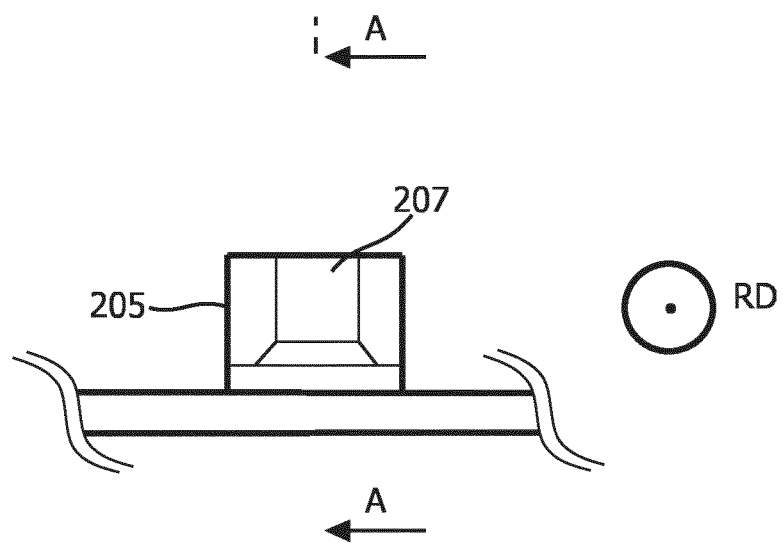
FIG. 6A, FIG. 6B depict zoomed-in views of a sealing gasket according to the invention comprising a tab portion taking the form of a truncated pyramid.
Figure 6B:
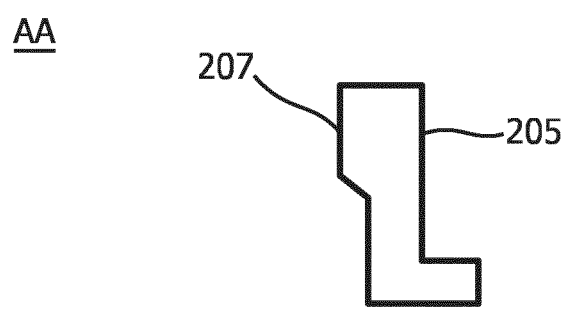

FIG. 6A depicts a zoomed-in front view of a tab portion 207 taking the form of a truncated pyramid as depicted by FIG. 5D, while FIG. 6B depicts the corresponding zoomed-in lateral cross-section view.

Figure 7:
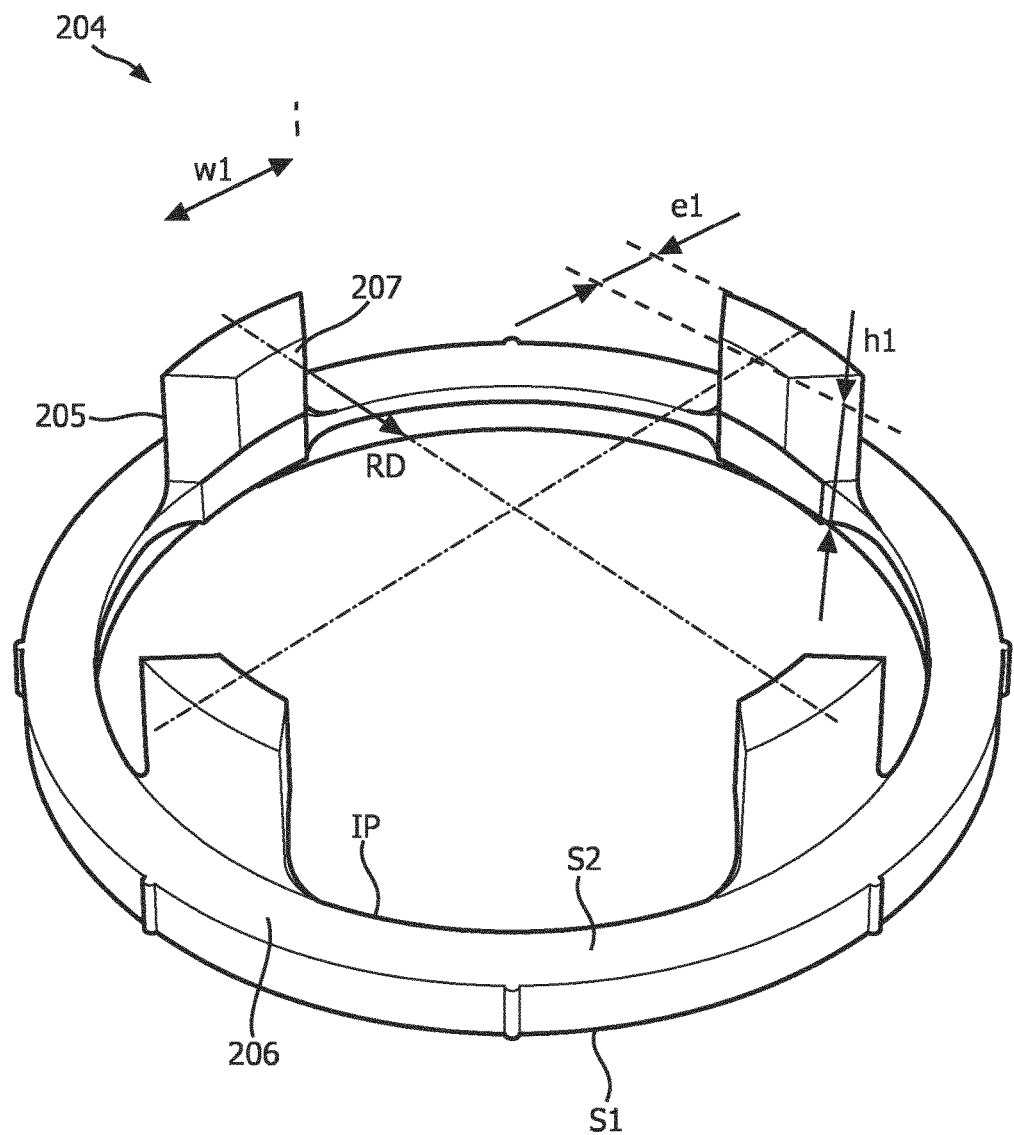
FIG. 7 depicts a three-dimensional zoomed-in view of a sealing gasket according to the invention.

FIG. 7 depicts a three-dimensional zoomed-in view of a sealing gasket 204 according to the invention. In this example, the sealing gasket 204 comprises four ribs 205.

Preferably, more than one rib 205 has a height h1 in the range [10 mm; 50 mm].

Preferably, more than one rib 205 has a thickness e1 in the range [3 mm; 15 mm].

Preferably, more than one rib 205 has a width w1 in the range [10 mm; 30 mm].

Those ranges of values are suitable for domestic appliances with a sealing gasket 204 having an external diameter with dimension between 100 mm and 150 mm.

Preferably, as depicted in FIG. 7, the sealing gasket 204 comprises a ring element 206 having a first surface S1 facing the detachable bottom part 203 and a second surface S2 facing the container 202. As depicted in FIG. 8A, FIG. 8B, FIG. 8C and FIG. 8D, at least one of the first surface S1 and the second surface S2 comprises concentric compression ribs CR1, CR2.

Figure 8A:
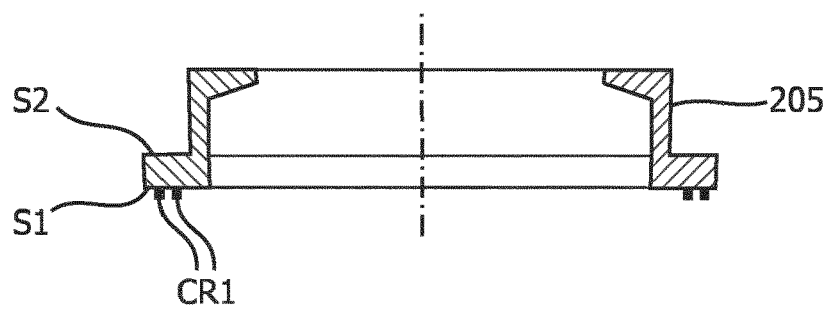
FIG. 8A, FIG. 8B, FIG. 8C, FIG. 8D depict various embodiments of a sealing gasket according to the invention comprising concentric compression ribs.

For example, as depicted in FIG. 8A, the compression ribs CR1 are on the first surface S1. The compression ribs CR1 aims to further improving the contact with the bottom part 203.

Figure 8B:
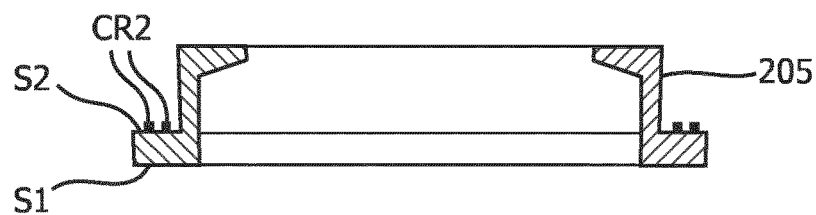
Figure 8C:
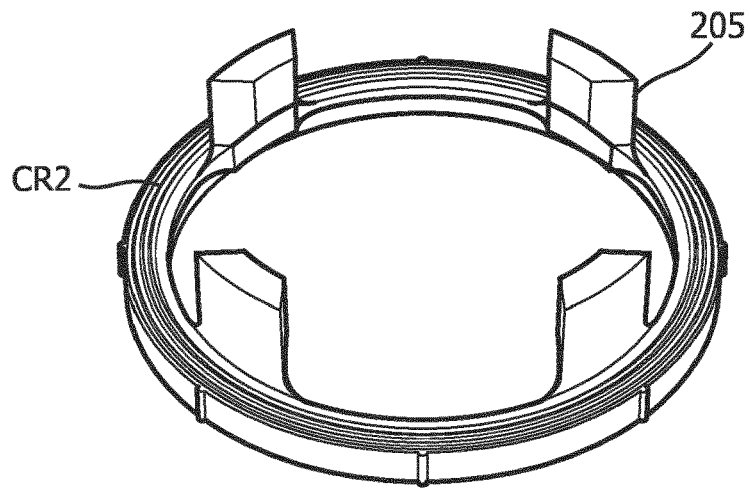

For example, as depicted in FIG. 8B, the compression ribs CR2 are on the second surface S2. The compression ribs CR2 aims to further improving the contact with the container 202. A corresponding three-dimensional view is depicted in FIG. 8C.

Figure 8D:
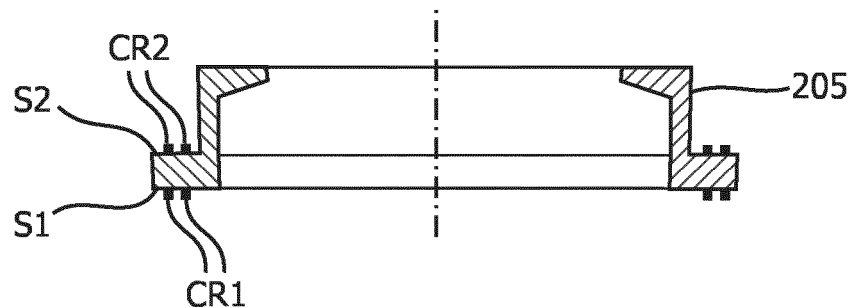

For example, as depicted in FIG. 8D, the compression ribs CR1 are on the first surface S1, and the compression ribs CR2 are on the second surface S2. The compression ribs CR1 aims to further improving the contact with the bottom part 203. The compression ribs CR2 aims to further improving the contact with the container 202.

Preferably, the sealing gasket 204 and the more than one rib 205 form a single element made of moulded rubber material. Alternatively, the more than one rib 205 are glued or attached as separate elements, and are for example made of plastic material.

Figure 9A:
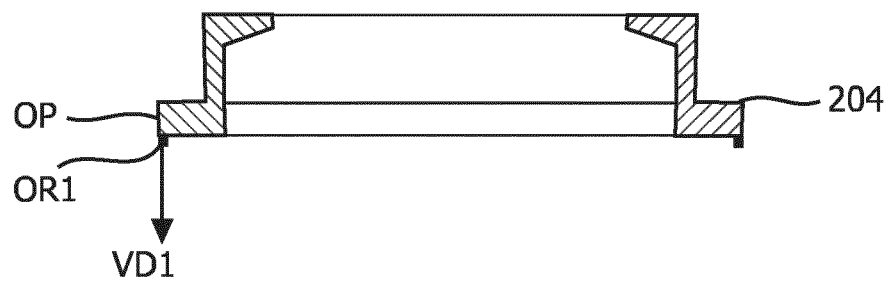
FIG. 9A, FIG. 9B, depict various embodiments of a sealing gasket according to the invention comprising outer ribs.

Preferably, as depicted in FIG. 9A, the sealing gasket 204 further comprises a first outer rib OR1 at an outer periphery OP of the sealing gasket 204. The first outer rib OR1 extends along a first vertical direction VD1 towards the detachable bottom part 203. The circumference of the first outer rib OR1 is such that it surrounds the detachable bottom part 203. The first outer rib OR1 facilitates centering the bottom part 203 on the sealing gasket 204.

Figure 9B:
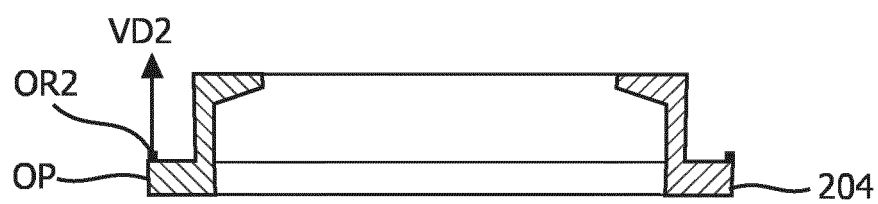

Preferably, as depicted in FIG. 9B, the sealing gasket 204 further comprises a second outer rib OR2 at an outer periphery OP of the sealing gasket 204. The second outer rib OR2 extends along a second vertical direction VD2 towards the container 202. The circumference of the second outer rib OR2 is such that it surrounds a lower part of the container 202. The second outer rib OR2 facilitates centering the container 202 on the sealing gasket 204.

Preferably (not shown), the sealing gasket 204 comprises both first outer rib OR1 and second outer rib OR2.

Figure 10:
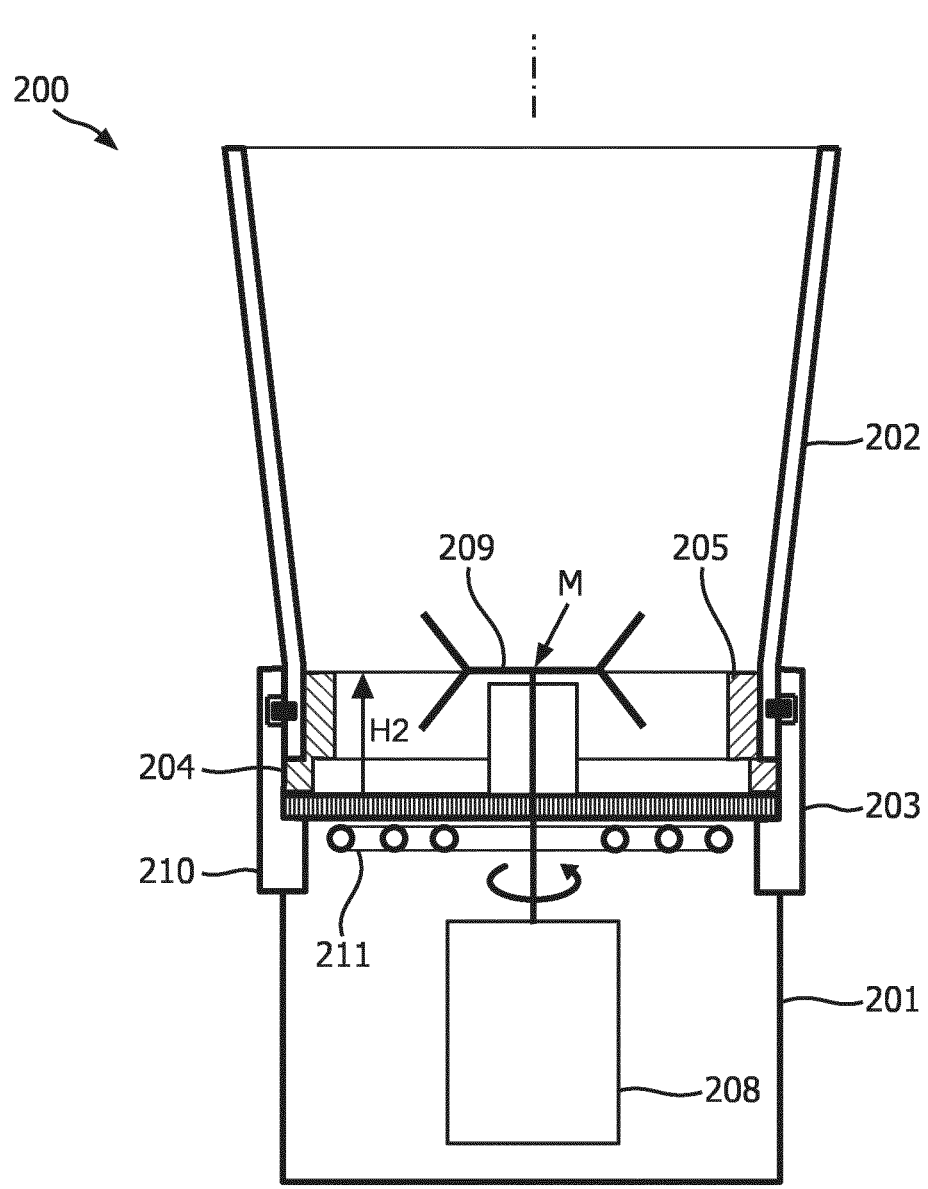
FIG. 10 depicts a blender according to the invention.

Preferably, as depicted in FIG. 10, the blender 200 according to the invention further comprises a blade assembly 209 comprising a plurality of blades and arranged on the bottom part 203 and extending inside the container 202. The blender also comprises a gearing system 208 to rotate the blade assembly 209. More than one rib 205 extends upwards inside the container 202 up to a height H2 where the plurality of blades connect, with a variation within a range of [−20%; +100%]. For example, if the height H2 is 50 mm, calculated from the bottom part 203, the more than one rib 205 extends inside the container 202 up to a height H2 to any value in the range [40 mm; 100 mm].

Preferably, as depicted in FIG. 10, the blender 200 according to the invention further comprises a locking element 210 to press the container 202, the sealing gasket 204 and the detachable bottom part 203 against each other. For example the locking element 210 is a bayonet mechanism with male/female parts arranged on the container 202 and the base 201.

Preferably, as depicted in FIG. 10, the base part 201 further comprises a heating element 211 to transfer heat by conduction to the detachable bottom part 203.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the spirit and scope of the technique approaches of the present invention, which will also fall into the protective scope of the claims of the present invention. In particular, although the invention has been described based on a kitchen appliance, it can be applied to any industrial blender, either to blend food ingredients or non-edible materials. In the claims, the word "comprising" does not exclude other elements or steps, and the indefinite article "a" or "an" does not exclude a plurality. Any reference signs in the claims should not be construed as limiting the scope.

The invention claimed is:

1. A blender comprising:
   a base part;
   a container arranged on said base part, wherein said container includes an opening that extends from an open top part to an open bottom part, and a detachable bottom part that closes the open bottom part of the container; and
   a sealing gasket arranged between said detachable bottom part and the open bottom part of said container to provide a seal between the detachable bottom part and the open bottom part of the container and to prevent food ingredients or liquids in the container from leaking outside the container, wherein said sealing gasket comprises a ring element having a first surface (S1) facing said detachable bottom part and a second surface (S2) facing said container, wherein at least one of said first surface (S1) and said second surface (S2) is provided with concentric compression ribs disposed on and elevated above a respective at least one of said first surface (S1) and said second surface (S2) in a region of a respective first or second surface between an inner periphery and an outer periphery of the ring element, and wherein said sealing gasket further comprises more than one rib provided on the inner periphery of the ring element, extending upwards from said second surface (S2) at the inner periphery of the ring element, and further extending upwards from said detachable bottom part inside said container to create turbulences among food ingredients or liquids during blending inside the container, wherein said more than one rib comprises a plurality of ribs distributed around the inner periphery (IP) of said sealing gasket.

2. The blender as claimed in claim 1, wherein said more than one rib extends along an internal surface (IS) of a lower portion (L) of said container.

3. The blender as claimed in claim 2, wherein at least one of said more than one rib comprises a tab portion extending along a direction (RD) being radial compared to said inner periphery (IP) of said sealing gasket.

4. The blender as claimed in claim 3, wherein said tab portion is arranged at an upper part (U) of said at least one of said more than one rib.

5. The blender as claimed in claim 3, wherein said tab portion takes the form of a truncated pyramid.

6. The blender as claimed in claim 1, wherein each of said first surface (S1) and said second surface (S2) is provided with two concentric compression ribs.

7. The blender as claimed in claim 1, wherein said sealing gasket and said more than one rib form a single element made of moulded rubber material.

8. The blender as claimed in claim 1, wherein said more than one rib has a height (h1) within a range of 10 mm to 50 mm.

9. The blender as claimed in claim 1, wherein said more than one rib has a thickness (e1) within a range of 3 mm to 15 mm.

10. The blender as claimed in claim 1, wherein said more than one rib has a width (w1) within a range of 10 mm to 30 mm.

11. The blender as claimed in claim 1, further comprising:
   a blade assembly that comprises a plurality of blades, wherein the blade assembly is arranged on said detachable bottom part and extends inside said container; and
   a gearing system to rotate said blade assembly, wherein said more than one rib extends upwards inside said container up to a height (H2) above said detachable bottom part inside said container where said plurality of blades connect to a shaft of the gearing system, with a variation in height of said more than one rib being within a range of −20% to +100% of height H2.

12. The blender as claimed in claim 1, further comprising a locking element to press said container, said sealing gasket and said detachable bottom part against each other.

13. The blender as claimed in claim 1, wherein said base part further comprises a heating element to transfer heat by conduction to said detachable bottom part.

* * * * *